(12) United States Patent
Matsumura et al.

(10) Patent No.: US 8,494,512 B2
(45) Date of Patent: Jul. 23, 2013

(54) COMMUNICATION TERMINAL, MOBILE COMMUNICATION SYSTEM, AND COMMUNICATION CONTROL METHOD

(75) Inventors: Takashi Matsumura, Yokohama (JP); Tomohiro Miki, Yamato (JP)

(73) Assignee: Kyocera Corporation, Kyoto (JP)

( * ) Notice: Subject to any disclaimer, the term of this patent is extended or adjusted under 35 U.S.C. 154(b) by 804 days.

(21) Appl. No.: 11/535,886

(22) Filed: Sep. 27, 2006

(65) Prior Publication Data

US 2007/0142058 A1    Jun. 21, 2007

(30) Foreign Application Priority Data

Sep. 29, 2005    (JP) ................................ 2005-285231

(51) Int. Cl.
    *H04W 24/00*    (2009.01)

(52) U.S. Cl.
    USPC ............... 455/423; 455/550.1; 455/115.1; 455/67.13; 340/635; 340/586; 340/588; 340/622

(58) Field of Classification Search
    USPC ................. 455/423, 67.11, 572–574, 550.1, 455/13.4, 115.1, 117, 127.1, 127.5, 343.1, 455/343.2, 522, 67.13; 340/635, 584, 588, 340/589, 622, 643, 586, 640, 646, 655
    See application file for complete search history.

(56) References Cited

U.S. PATENT DOCUMENTS

| | | | |
|---|---|---|---|
| 4,870,698 A * | 9/1989 | Katsuyama et al. | 455/522 |
| 6,087,949 A | 7/2000 | Yanagida | |
| 6,504,484 B1 * | 1/2003 | Weng | 340/584 |
| 6,760,311 B1 | 7/2004 | Raith | |
| 6,934,267 B1 * | 8/2005 | Mannerstråle | 370/311 |
| 7,053,607 B2 * | 5/2006 | Sato | 324/224 |
| 7,206,567 B2 * | 4/2007 | Jin et al. | 455/404.1 |
| 7,321,272 B2 * | 1/2008 | Neumann | 331/176 |
| 7,386,332 B2 * | 6/2008 | Masuda et al. | 455/575.4 |
| 7,606,566 B2 * | 10/2009 | Ogoshi | 455/423 |
| 2002/0116143 A1 * | 8/2002 | Lalau et al. | 702/130 |
| 2004/0085940 A1 * | 5/2004 | Black et al. | 370/337 |

FOREIGN PATENT DOCUMENTS

| | | |
|---|---|---|
| CN | 1234674 A | 11/1999 |
| JP | 07264114 A | 10/1995 |
| JP | 2000-083009 | 3/2000 |
| JP | 2002-171287 | 6/2002 |
| JP | 2002531023 A | 9/2002 |
| JP | 2003-309512 | 10/2003 |
| JP | 2004194237 A | 7/2004 |
| JP | 2004336455 A | 11/2004 |
| WO | 0031990 A2 | 6/2000 |
| WO | 0133722 A1 | 10/2001 |

OTHER PUBLICATIONS

Chinese language office action and its English language translation for corresponding Chinese application 200610139933.4 lists the references above.

Japanese language office action dated Aug. 3, 2010 and its English language translation for corresponding Japanese application 2005285231 lists the references above.

\* cited by examiner

*Primary Examiner* — Sujatha Sharma

(74) *Attorney, Agent, or Firm* — DLA Piper LLP (US)

(57) ABSTRACT

A communication terminal includes a first wireless communication unit that communicates with a base station; a second wireless communication unit that communicates with another communication terminal including an equivalent of the first wireless communication unit; a temperature measurement unit; and a control unit that selects one of the first wireless communication unit and the second wireless communication unit according to a temperature measured by the a temperature measurement unit.

7 Claims, 10 Drawing Sheets

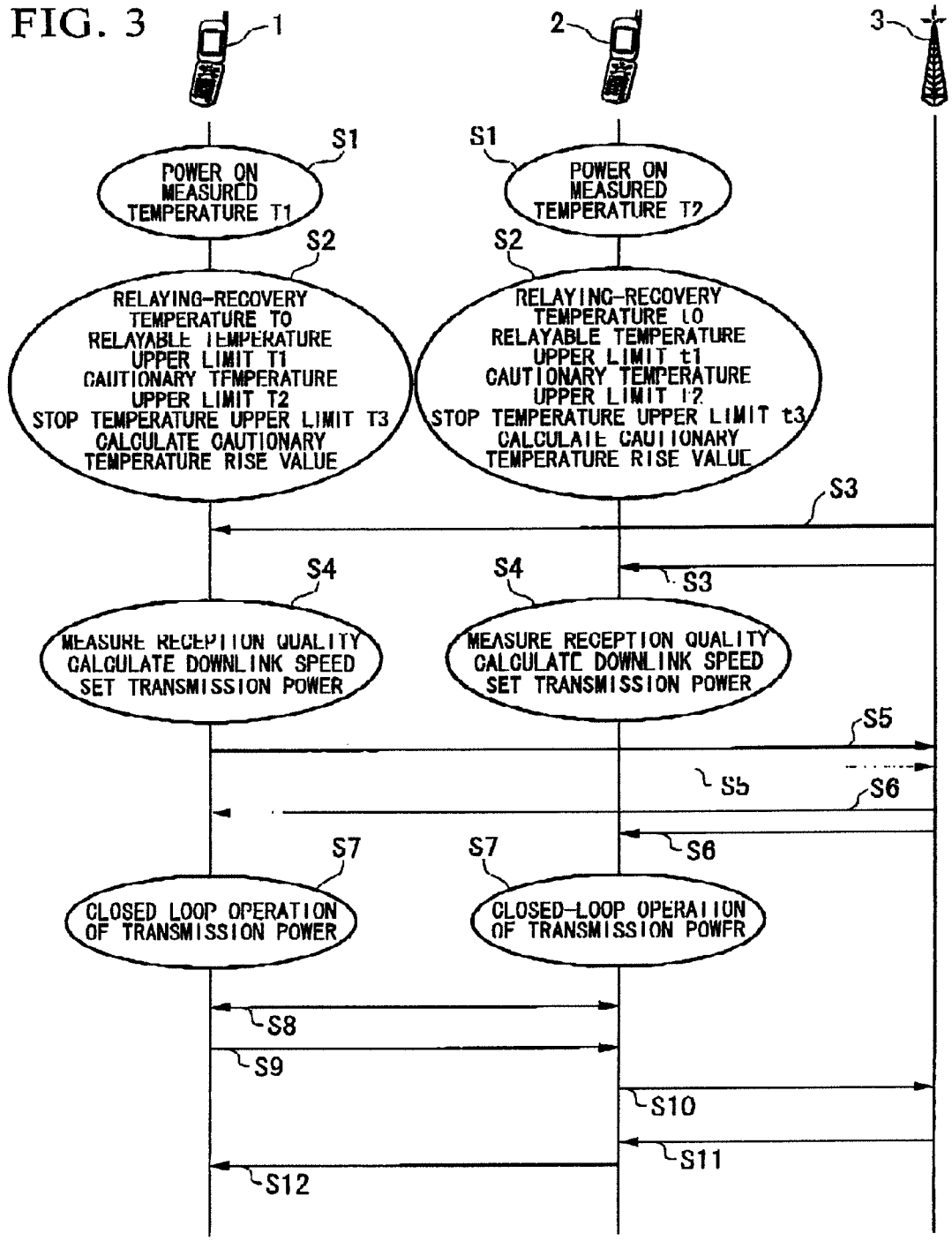

$$\text{CAUTIONARY TEMPERATURE RISE FACTOR} = \frac{\Delta \text{bit/s}}{\Delta ^\circ \text{C}} \quad \cdots (1)$$

CAUTIONARY TEMPERATURE RISE VALUE Tu =
(REMAINING AMOUNT OF DATA / CAUTIONARY TEMPERATURE RISE FACTOR) + 1

$$\cdots (2)$$

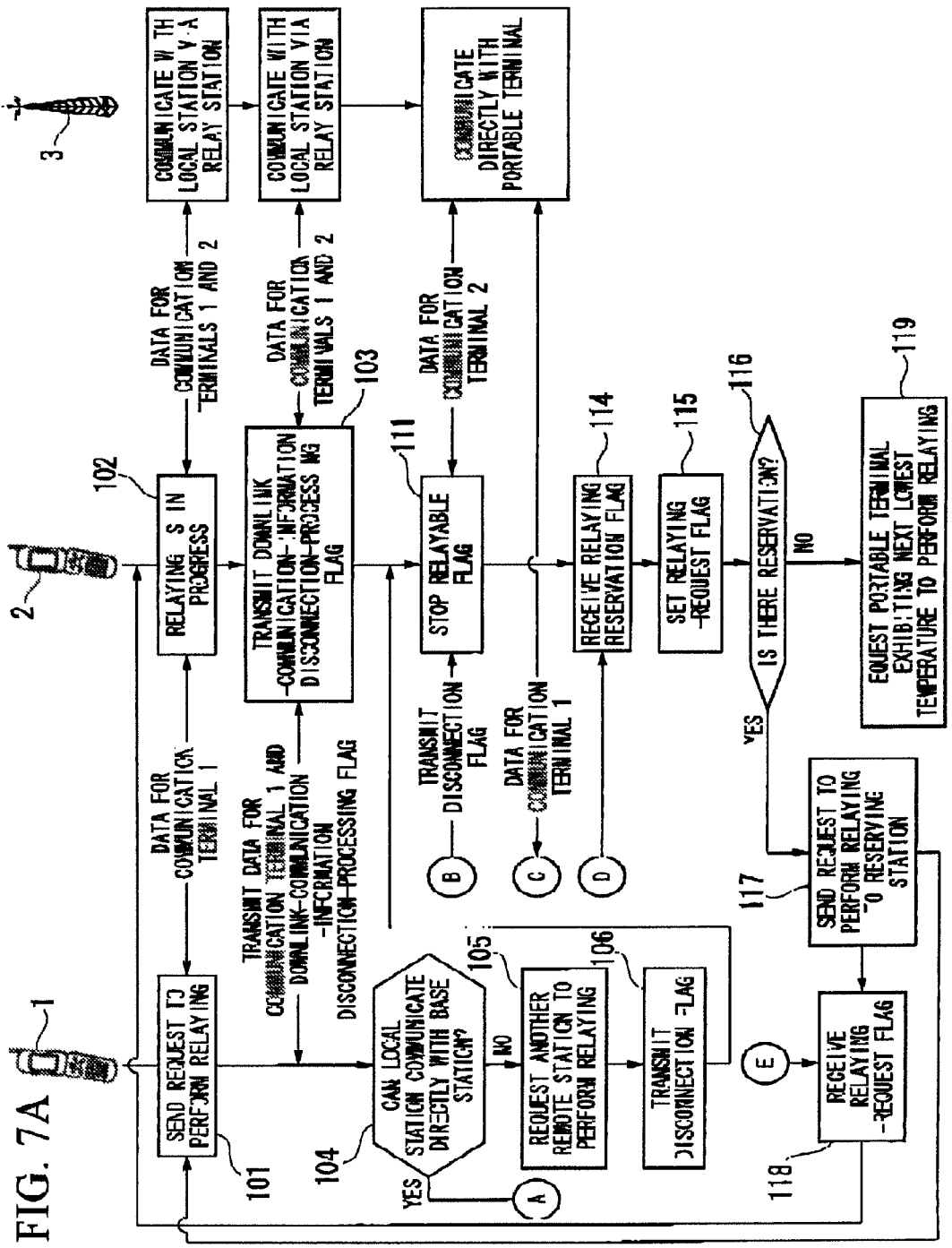

FIG. 8

EXTENDED DRC FRAME ADDITIONALLY PROVIDED WITH MAC ADDRESS

| MAC ADDRESS | DRC |
|---|---|
| 6bit | 4bit |

COMMUNICATION TERMINAL, MOBILE COMMUNICATION SYSTEM, AND COMMUNICATION CONTROL METHOD

CROSS-REFERENCE TO RELATED APPLICATION

Priority is claimed on Japanese Patent Application No. 2005-285231, filed Sep. 29, 2005, the content of which is incorporated herein by reference.

BACKGROUND OF THE INVENTION

1. Field of the Invention

The present invention relates to a communication terminal, a mobile communication system, and a communication control method.

2. Description of the Related Art

Wireless communication systems for variably controlling downlink (from base station to terminal) communication speeds (hereinafter, referred to as "downlink speeds") according to a reception state at each communication terminal are known, as typified by CDMA2000 1xEV-DO. These wireless communication systems employ a wireless communication technique for achieving a tradeoff between downlink speed, and, for example, error resilience by exploiting a plurality of modulation techniques, spread rates, etc., so that a higher communication speed can be provided according to the reception state at each communication terminal. A communication terminal based on this wireless communication technique measures the quality of a signal (the carrier to interference code (CIR) of the signal) received from the base station and requests the highest possible downlink speed for assuming successful data reception from the base station with error rates equal to or below a predetermined level. On the other hand, in response to requests about downlink speeds from a plurality of communication terminals, the base station performs scheduling of the requests and determines a communication terminal to which downlink communication information is to be transmitted. Although telecommunication carriers can employ any desired technique for this destination determination scheduling, a scheduling algorithm called proportional fair scheduling is commonly employed. This scheduling technique features a good balance between fairness of communication speeds among a plurality of subscribers and a maximized total throughput in the overall base station. More specifically, in the proportional fair scheduling, an average communication traffic volume R over a past period of certain length is calculated (typically, the average of traffic over the past one second or so is calculated based on the moving average or logarithmic mean) for each communication terminal to assign downlink communication information to a communication terminal exhibiting the maximum ratio of DRC to R (DRC/R), where DRC is a requested downlink speed and R is the above-described average communication traffic volume (refer to, for example, Japanese Unexamined Patent Application Publication, First Publication No. 2002-171287).

On the other hand, for a wireless communication system in which a base station communicates with communication terminals, there is a known communication technique for achieving communication between the base station and a communication terminal outside the communication area covered by the base station by using another communication terminal existing in the communication area of the base station as a relay station (refer to, for example, Japanese Unexamined Patent Application Publication, First Publication No. 2003-309512).

Also, for a wireless communication system in which a base station controls the transmission power of each communication terminal according to the reception state at the communication terminal, there is another known technique for preventing overheating due to heat generated in a transmission power amplifier by decreasing the transmission output when the temperature exceeds a preset permissible temperature and increasing the transmission output to the original level when the temperature falls below the permissible temperature (refer to, for example, Japanese Unexamined Patent Application Publication, First Publication No. 2000-083009).

In the wireless communication system described in Japanese Unexamined Patent Application Publication, First Publication No. 2002-171287, any obstacle, such as a tall building, between the base station and a communication terminal may interfere with radio reception by the communication terminal, and in such a poor reception state a high transmission output is maintained. This may cause the transmission power amplifier to overheat.

SUMMARY OF THE INVENTION

The present invention has been conceived in light of these circumstances, and an object thereof is to provide a communication terminal, a mobile communication system, and a communication control method for preventing the transmission power amplifier of one communication terminal (local station) from overheating by using another communication terminal (remote station) located in an inter-communicable range as a relay station.

In order to overcome the above-described problems, a communication terminal according to one aspect of the present invention includes a first wireless communication section for communicating with a base station; a second wireless communication section for communicating with another communication terminal including an equivalent of the first wireless communication section; a temperature measurement section; and a control section for selecting one of the first wireless communication section and the second wireless communication section according to a temperature measured by the temperature measurement section.

In the above-described communication terminal, when the second wireless communication section is to be selected, the control section may determine whether a communication partner can communicate with the second wireless communication section to select the second wireless communication section or the communication partner.

In the above-described communication terminal, if the second wireless communication section can be used, the control section may report that the second wireless communication section can be used.

In the above-described communication terminal, the control section may manage temperature limits up to which the first and second wireless communication sections can be used based on the measured temperature.

In the above-described communication terminal, the control section may predict whether each of the first and second wireless communication sections can be used based on the remaining amount of communication data and the measured temperature.

In the above-described communication terminal, the control section may reserve a communication partner of the second wireless communication section.

A mobile communication system according to another aspect of the present invention includes a base station and a plurality of communication terminals. At least one of the plurality of communication terminals includes a first wireless communication section for communicating with the base station; a second wireless communication section for communicating with another communication terminal including an equivalent of the first wireless communication section; a temperature measurement section; and a control section for selecting one of the first wireless communication section and the second wireless communication section according to a temperature measured by the temperature measurement section. One communication terminal relays communication between the base station and another communication terminal by using the second wireless communication section.

According to still another aspect of the present invention, a communication control method for controlling first communication between a base station and one communication terminal and second communication between the one communication terminal and another communication terminal includes the steps of measuring temperatures of the communication terminals; and selecting one of the first communication and the second communication according to the measured temperatures.

According to the present invention, the transmission power amplifier of one communication terminal (local station) can be prevented from overheating by using another communication terminal (remote station) located in an inter-communicable range as a relay station while still continuing communication. This improves the user experience.

BRIEF DESCRIPTION OF THE DRAWINGS

FIG. 3 is a diagram illustrating communication processing between a local station, a remote station, and a base station.

FIGS. 7A and 7B are flowcharts illustrating a disconnection processing operation in a mobile communication system according to the present invention.

FIG. 8 is a diagram depicting an example of an extended DRC frame additionally provided with a MAC address.

DETAILED DESCRIPTION OF THE INVENTION

One embodiment according to the present invention will now be described with reference to the drawings.

Figure 1:
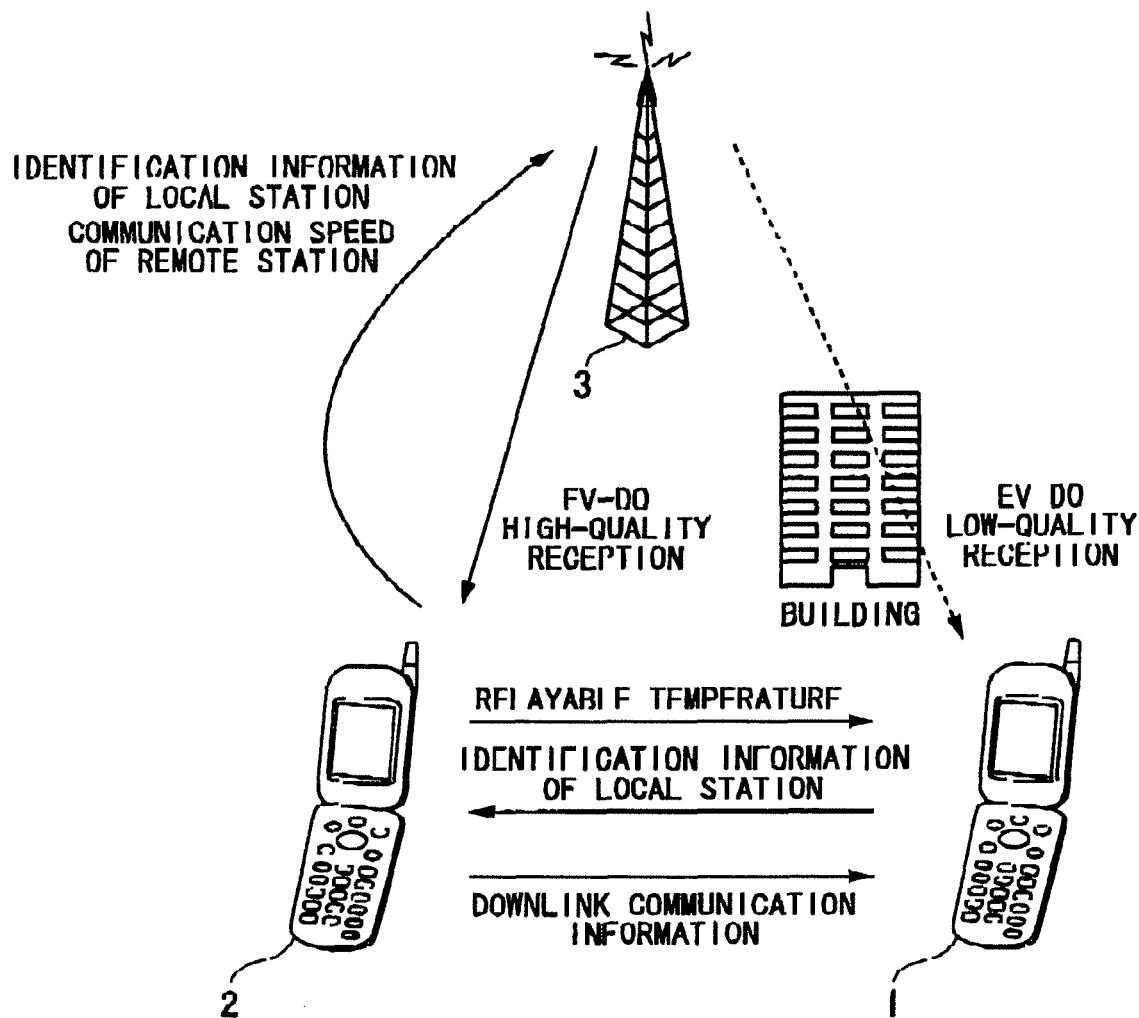
FIG. 1 is a diagram depicting a positional relationship between a base station and communication terminals.

FIG. 1 is a diagram depicting a preferred overall structure of a mobile communication system according to one embodiment of the present invention. FIG. 1 shows an exemplary positional relationship among a base station 3, a mobile communication terminal 1 (hereinafter, referred to as a communication terminal) serving as a local station, and a communication terminal 2 serving as a remote station. This embodiment is described by way of example of a mobile communication system employing a communication technique for controlling the transmission power of a communication terminal according to the reception state at that communication terminal, as typified by the CDMA2000 1xEV-DO standard. Thus, the current description assumes that the communication terminal 1 serving as the local station suffers from low-quality reception due to an obstacle, such as a building, located between the local station and the base station 3, whereas the communication terminal 2 serving as the remote station is a high-quality reception state from the base station 3.

The communication terminals 1 and 2 shown in FIG. 1 have a communication function for achieving direct communication therebetween (not via an access point) based on ad-hoc communication, which is one of the communication techniques used over a relatively short distance, such as WiFi or WiMAX for wireless local area network (LAN), compared with the above-described communication technique.

Although only two communication terminals 1 and 2 are shown in FIG. 1, the number of communication terminals is not limited to two and may be three or more.

Terms used in the specification and claims are defined below.

The terms "local station" and "remote station" are logical names referring to a communication terminal in a particular state. The local station represents a communication terminal that is in a lower-quality reception state, whereas the remote station represents a communication terminal that is in a higher-quality reception state. Basically, the local station is a communication terminal that requests the remote station to relay downlink communication information, and the remote station is a communication terminal that relays the downlink communication information from a base station to the local station in response to the request to perform relaying sent from the local station. Therefore, the local station needs to include at least relaying-request means for requesting the remote station to carry out relaying, and the remote station needs to include at least relaying execution means for relaying downlink communication information to the local station. In the example shown in FIG. 1, the communication terminal 2 corresponds to the remote station, and the communication terminal 1 corresponds to the local station, where the two communication terminals 1 and 2 each include both relaying-request means and relaying-execution means. If an obstacle such as a building is located not between the base station 3 and the communication terminal 1 but between the base station 3 and the communication terminal 2, the communication terminal 2 may function as a local station and the communication terminal 1 may function as a remote station. The term "reception state" means the quality of a signal received from the base station at a communication terminal, as expressed in the form of carrier to interference ratio (CIR). The term "relayable temperature" indicates a temperature range within which a communication terminal can serve as a relay station. The relayable temperature is obtained from the operating temperature of the communication terminal. The term "communication information" refers to traffic data. The term "transmission request" is a request sent from the remote station to the base station for the transmission of downlink communication information to the local station. The transmission request includes identification information (MAC address) of the local station and a communication speed of the remote station.

Figure 2:
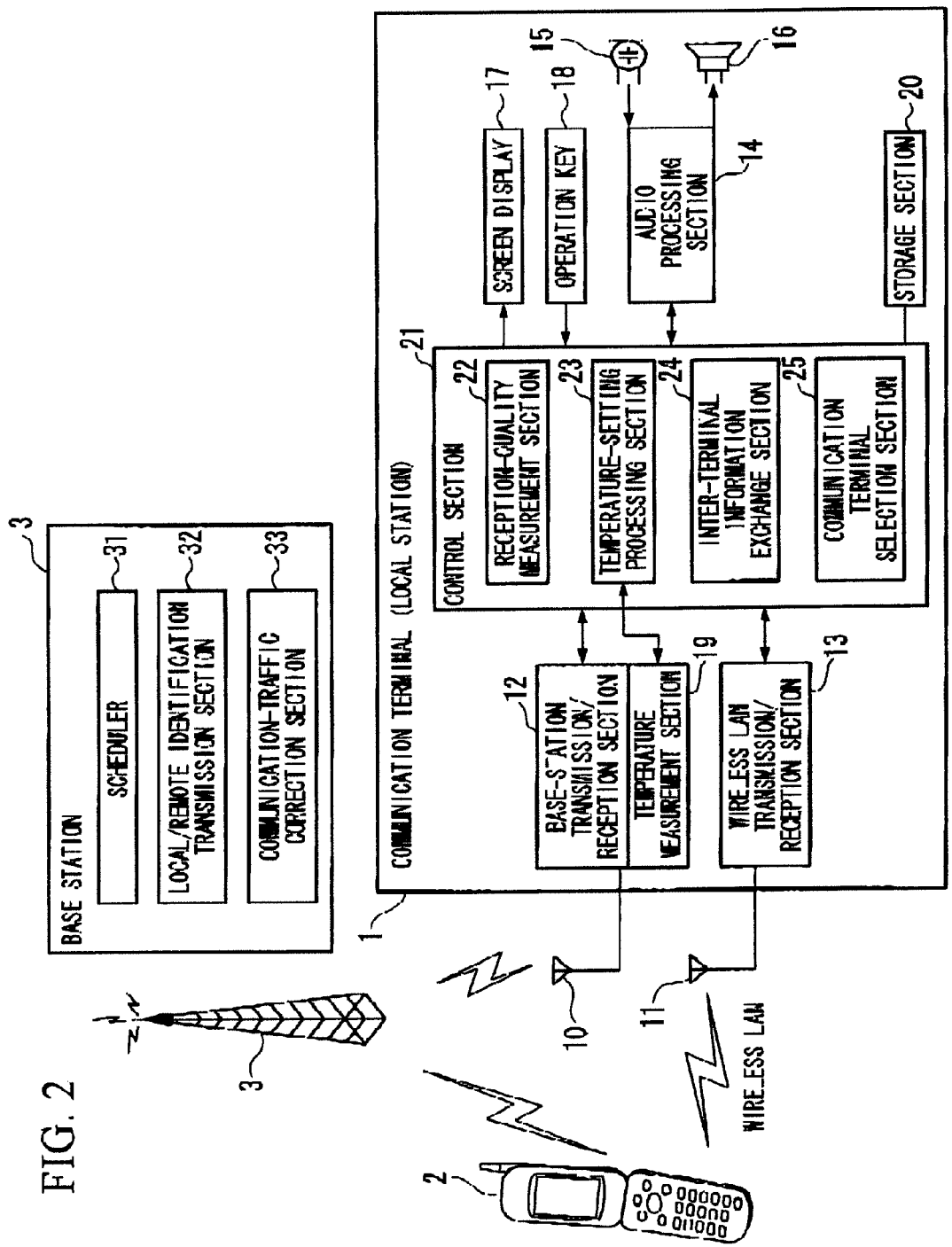
FIG. 2 is a diagram depicting an exemplary structure of a mobile communication system according to the present invention.

Next, preferred structures of the communication terminal 1 and the base station 3 shown in FIG. 1 are described with reference to FIG. 2. FIG. 2 is a block diagram depicting preferred structures of the communication terminal 1 and the base station 3 shown in FIG. 1. Since the structure of the communication terminal 2 shown in FIG. 1 is similar to that of the communication terminal 1, a detailed description of the structure of the communication terminal 2 will be omitted.

Referring to the communication terminal 1 in FIG. 2, a base-station transmission/reception section 12 is a circuit for performing transmission and reception processing to and from the base station 3 under the control of a control section 21. An antenna 10 is connected to the base-station transmission/reception section 12. A wireless LAN transmission/reception section 13 is a circuit for performing transmission and reception processing to and from a communication terminal as a remote station (the communication terminal 2 in this example) under the control of the control section 21. An antenna 11 is connected to the wireless LAN transmission/reception section 13.

The control section 21 controls the base-station transmission/reception section 12, an audio processing section 14, a screen display 17, and an operation key 18 to carry out call handling in audio communication, transmission/reception processing of e-mail, etc. The control section 21 also controls communication processing with a communication terminal as a remote station through the wireless LAN transmission/reception section 13. In addition, the control section 21 controls a temperature measurement section 19. The temperature measurement section 19 measures the temperature in the casing of the communication terminal 1 itself.

The control section 21 includes a reception-quality measurement section 22; a temperature-setting processing section 23; an inter-terminal information exchange section 24; and a communication terminal selection section 25 as main functional sections for realizing a function of the present invention.

The reception-quality measurement section 22 performs the process of receiving a downlink pilot signal from the base station 3 and measuring a reception quality (CIR). The temperature-setting processing section 23 calculates a cautionary temperature rise value based on temperature data stored in a storage section 20 and temperature data obtained from the temperature measurement section 19. The inter-terminal information exchange section 24 performs the process of exchanging information with another communication terminal via a wireless LAN. Information to be exchanged includes relayable temperature data for the local station and a relayable flag. The communication terminal selection section 25 performs the process of selecting the communication terminal 2, serving as the remote station, to which a request to perform relaying is to be sent, if the temperature of the local station exceeds a cautionary temperature upper limit and the temperature of the remote station is below a relayable temperature upper limit.

The audio processing section 14 is a circuit for performing encoding/decoding processing of audio signals, and is connected to a microphone 15 and a speaker 16. The storage section 20 stores programs executed by the control section 21 and other data. It is also used to save received data.

With the above-described structure of the communication terminal 1, the reception-quality measurement section 22 measures the reception state of the local station, i.e., the communication terminal 1 itself. The temperature-setting processing section 23 acquires a relaying-recovery temperature setting, the relayable temperature upper limit, the cautionary temperature upper limit, and a stop temperature upper limit stored in the storage section 20 to calculate a cautionary temperature rise value based on the temperature data obtained by the temperature measurement section 19 and an increased temperature. In addition, the inter-terminal information exchange section 24 reports a relayable temperature of the local station to neighboring communication terminals that can communicate directly therewith, as long as there is no communication information destined for the local station and communication information for a remote station can be relayed. Otherwise, the inter-terminal information exchange section 24 receives information about relayable temperature from neighboring communication terminals. The communication terminal selection section 25 compares among the difference values between the temperatures of remote stations and their respective relayable temperature upper limits and selects a relayable communication terminal 2 (as a remote station) exhibiting the largest of all the difference values, if the temperature of the local station exceeds the cautionary temperature upper limit and the temperature of the remote station is below the relayable temperature upper limit. It should be noted, however, that if there is only one communication terminal 2 as a remote station as shown in the example of FIGS. 1 and 2, only the process of determining the relayable flag of the remote station is performed.

A control section of the base station 3 includes a scheduler 31, a local/remote identification transmission section 32, and a communication-traffic correction section 33. The scheduler 31 performs the process of determining the transmission order of downlink traffic data (communication information), the amount of transmission, etc. based on the "requested amount of transmission (or requested speed) with respect to the average of past communication traffic (calculated over a predetermined period or according to a predetermined algorithm)," as is achievable by, for example, the proportional fair scheduling. The local/remote identification transmission section 32 performs the process of receiving a transmission request including the identification information of the local station from the communication terminal 2 as the remote station, referring to the identification information of the communication terminal 1 as the local station, which has made a request to perform relaying, in this header information, and transmitting downlink traffic data (communication information) to the communication terminal 1 as the local station via the communication terminal 2 as the remote station that performs relaying.

When previous communication traffic sent to each communication terminal is to be calculated, the communication-traffic correction section 33 regards downlink traffic data transmitted to the communication terminal that has performed relaying (communication terminal 2 as the remote station) as having been transmitted to the communication terminal that has made a request to perform relaying (communication terminal 1 as the local station). More specifically, the communication-traffic correction section 33 performs the process of subtracting the above-described communication traffic (communication traffic of the data that has been relayed) from the previous communication traffic in the communication terminal 2 as the remote station that has performed relaying and adding the above-described communication traffic (communication traffic of the data that has been relayed by the remote station) to the previous communication traffic in the communication terminal 1 as the local station that has made a request to perform relaying.

FIG. 3 is a diagram illustrating communication processing between a local station, a remote station, and a base station. This communication operation between the two communication terminals 1 and 2 and the base station 3 will be described below with reference to FIG. 3. The current description assumes that the communication terminal 1 as the local station needs to receive downlink traffic data from the base station 3 and that the communication terminal 2 as the remote station, which exists in the communication area of the base station 3, does not need to receive downlink traffic data.

When started up at power on, the communication terminal 1 and the communication terminal 2 each start temperature measurement by the temperature measurement section 19 (step S1). Then, various temperature data are read out and temperature setting is carried out (step S2). More specifically, the relaying-recovery temperature setting, the relayable temperature upper limit, the cautionary temperature upper limit, and the stop temperature upper limit are read out from the storage section 20. Furthermore, a cautionary temperature rise value is calculated from the temperature data obtained from the temperature measurement section 19 and an increased temperature.

Next, the communication terminal 1 and the communication terminal 2 each receive a downlink pilot signal from the base station 3 (step S3), measure the reception state to calculate a receivable downlink speed, and set transmission power (step S4). Next, the communication terminal 1 and the communication terminal 2 each return the calculated downlink speed (DRC) to the base station 3 (step S5) and receive power bits from the base station 3 (step S6), thus allowing the base station 3 to control the transmission power (closed-loop operation of transmission power)(step S7).

The communication terminal 1 and the communication terminal 2 typically exchange relayable flags in the subsequent step. In this example, the communication terminal 1 only receives the relayable flag of the remote station from the communication terminal 2 and does not transmit the relayable flag thereof (i.e., relayable flag of the local station) to the communication terminal 2 since the communication terminal 1 is not in a relayable state (step S8). If it is determined that the relayable temperature upper limit T1 is greater than the cautionary temperature upper limit T2 in the communication terminal 1, the communication terminal 1 requests the communication terminal 2 to perform relaying (step S9).

Next, upon receiving a request to perform relaying from the communication terminal 1, the communication terminal 2 transmits a downlink traffic request (transmission request) including additional relaying information to the base station 3 (step S10). The base station 3 transmits downlink traffic data destined for the communication terminal 1 as the local station in the communication terminal 2 (step S11). In response, the communication terminal 2 relays the downlink traffic data destined for the communication terminal 1 received from the base station 3 to the communication terminal 1 via a wireless LAN (step S12).

The reason the receivable downlink communication information has been transmitted when the communication terminal 1 as the local station is in a relayable state is to prevent a request to perform relaying from being received from the communication terminal 2 as the remote station. It is to be noted, however, that regardless of whether there are communication terminals 2 as remote stations that can communicate directly with the communication terminal 1 as the local station, the communication terminal 1 has no choice but to directly communicate with the base station 3 if there are no relayable communication terminals 2.

As described above, according to the mobile communication system and the communication terminals of the present invention, the communication terminal 1 (the local station) can be prevented from overheating by using the communication terminal 2 (the remote station) as a relay station before overheating occurs due to an increase in the temperature of the casing of the communication terminal 1 as the local station. This improves the user experience.

Figure 4A:
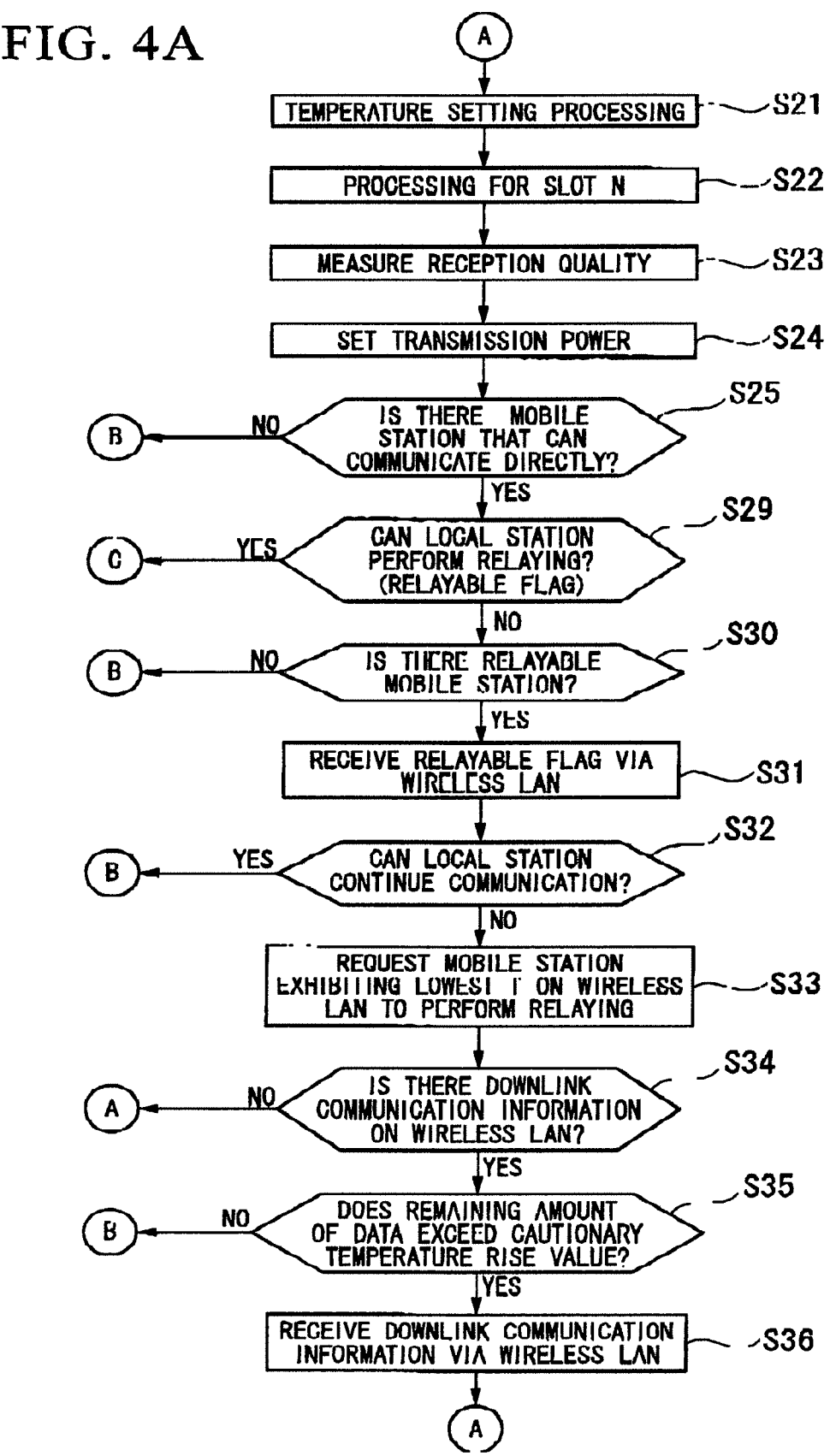
FIGS. 4A-4C are flowcharts illustrating an exemplary operation of a communication terminal.
Figure 4B:
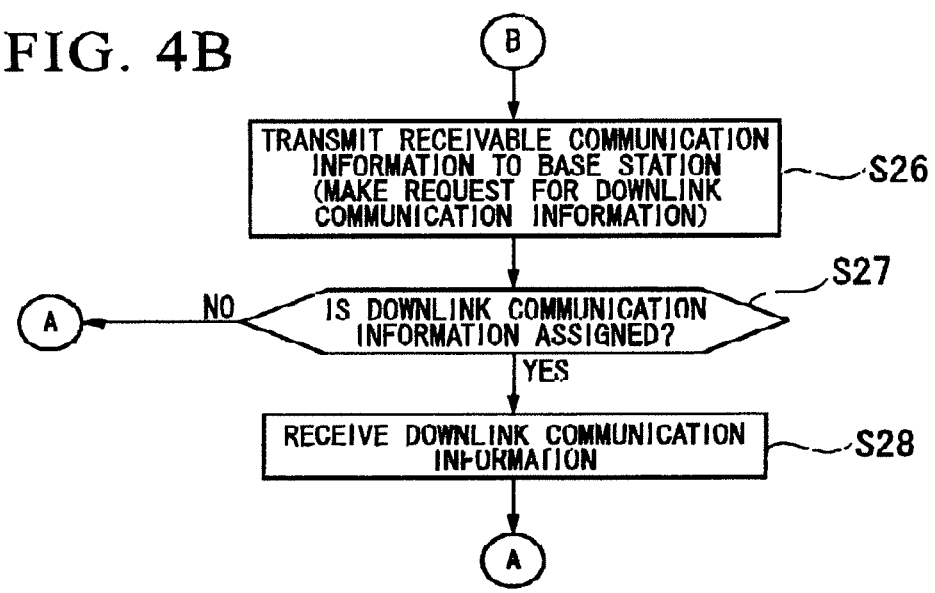
Figure 4C:
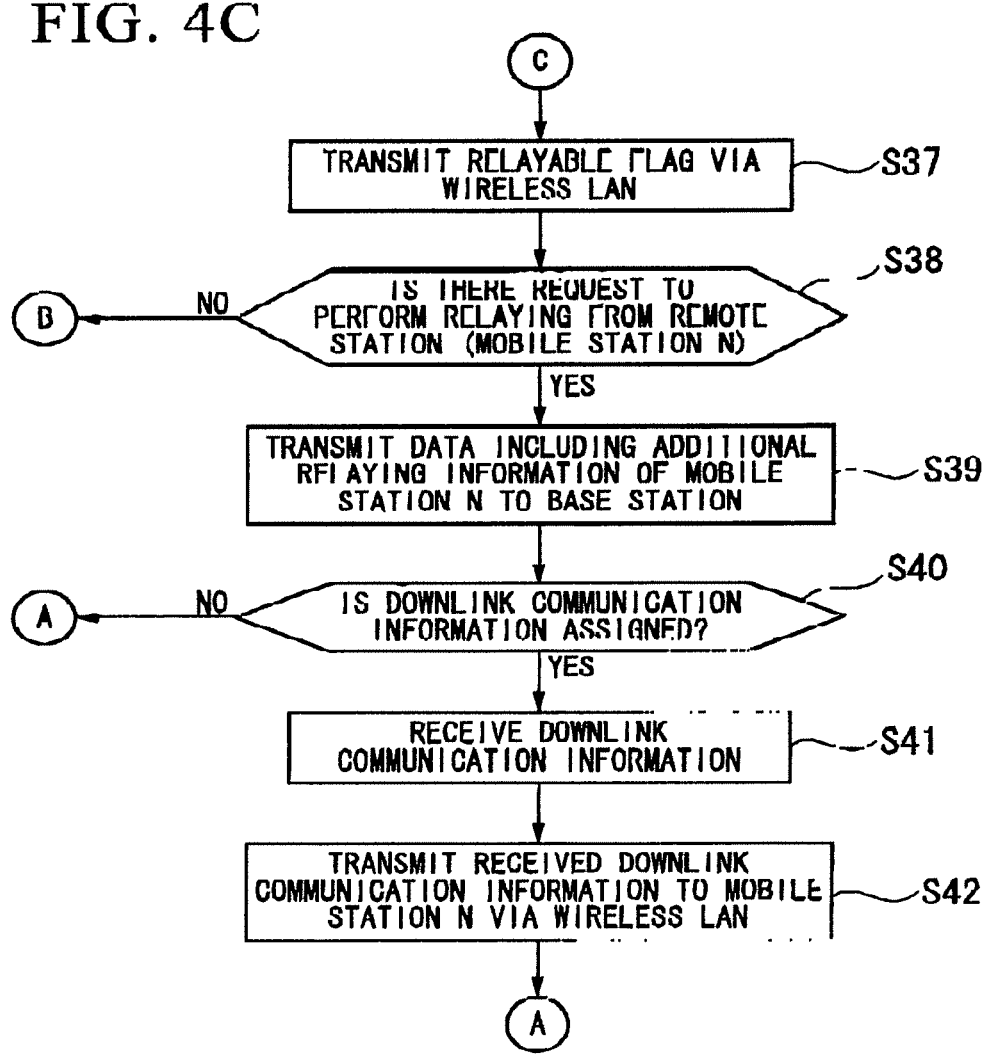

Next, the internal processing operation of the communication terminal 1 will be described in detail with reference to FIGS. 4A-4C. FIGS. 4A-4C are flowcharts illustrating the operation of the communication terminal 1. The flowcharts shown in FIGS. 4A-4C illustrates a processing operation as applied when the communication terminal 1 includes both relaying-request means and relaying execution means.

Referring to FIGS. 4A 4C, the communication terminal 1 starts temperature setting processing (step S21). This temperature setting processing will be described later. Next, processing for slot a is started (step S22). In the communication terminal 1, the reception state is measured based on a downlink pilot signal from the base station 3 (step S23), and the transmission power is set (step S24).

Next, the communication terminal 1 determines whether there is a communication terminal 2 as a remote station that can communicate directly therewith via a wireless LAN (step S25). If it is determined in step S25 that there is no communication terminal 2 as a remote station that can communicate directly via a wireless LAN, the communication terminal 1 transmits data, including receivable downlink communication information of the local station, to the base station 3 to make a request to transmit downlink traffic data (communication information destined for the local station)(step S26). Then, if downlink traffic data is assigned, the communication terminal 1 receives the downlink traffic data from the base station 3 (steps S27 and S28), and if no downlink traffic data is assigned, the flow returns to step S21.

On the other hand, if it is determined in step S25 that there is a communication terminal 2 as a remote station that can communicate directly with the communication terminal 1 via a wireless LAN, it is determined whether the communication terminal 1 (local station) can perform relaying (step S29). If it is determined in step S29 that the local station cannot perform relaying, the flow proceeds to step S30, where it is determined whether there is a relayable communication terminal 2. If there is no relayable communication terminal 2 in step S30, the flow proceeds to step S26, where the process of receiving downlink traffic data is performed in the local station. If it is determined in step S30 that there is a relayable communication terminal 2, a relayable flag that can be received is received from the relayable communication terminal 2 via a wireless LAN (step S31).

Next, the communication terminal 1 determines whether communication can be continued in the local station itself based on a relaying-request flag (step S32). If there is no relaying-request flag (communication can be continued in the local station) in step S32, the flow proceeds to step S26, where the process of receiving the downlink traffic data is performed in the local station. If there is a relaying request flag (communication cannot be continued in the local station) in step S32, a request to perform relaying is sent to a communication terminal exhibiting the lower measured temperature T (the communication terminal 2 in this example) via a wireless LAN (step S33). Then, if there is downlink traffic data on the wireless LAN and the amount of remaining data (cautionary temperature rise value) exceeds the cautionary temperature upper limit, the downlink traffic data is received via the wireless LAN (steps S34, S35, and S36). If there is no downlink traffic data on the wireless LAN or the remaining amount of data (cautionary temperature rise value) does not exceed the cautionary temperature upper limit, the flow proceeds to step S26, where the process of receiving downlink traffic data is performed in the local station. The cautionary temperature rise value will be described later.

On the other hand, if it is determined in step S29 that the local station can perform relaying, the flow proceeds to step S37, where a relayable flag that can be received is transmitted via a wireless LAN. Then, it is determined whether there is a request to perform relaying from a communication terminal n as a remote station (remote station making a request to perform relaying)(step S38). If there is no request to perform relaying in step S38, the flow proceeds to step S26. If there is a request to perform relaying from a communication terminal n in step S38, the communication terminal 1 transmits data additionally provided with relaying information of the communication terminal n to the base station 3 (step S39).

Next, the communication terminal 1 determines whether downlink traffic data has been assigned (step S40). If downlink traffic data has been assigned in step S40, then the downlink traffic data is received (step S41), and the received downlink traffic data is transmitted to the communication terminal n via a wireless LAN (step S42). On the other hand, if it is determined in step S40 that no downlink traffic data has been assigned, the flow returns to step S21.

Through the above-described processing operation, communication can be performed by using as a relay station the communication terminal exhibiting the lowest temperature in the casing from among a plurality of communication terminals existing in a directly communicable area. This prevents the local station and the relay station from overheating while communication is still continued. As a result, the user experience can be improved.

When the communication terminal 1 is to request the communication terminal 2 to perform relaying, the communication terminal 1 requests the communication terminal 2 to relay downlink traffic data destined for the local station via a wireless LAN, and the communication terminal 2 as the remote station sends a transmission request to the base station 3 in response to this request.

Figure 5:
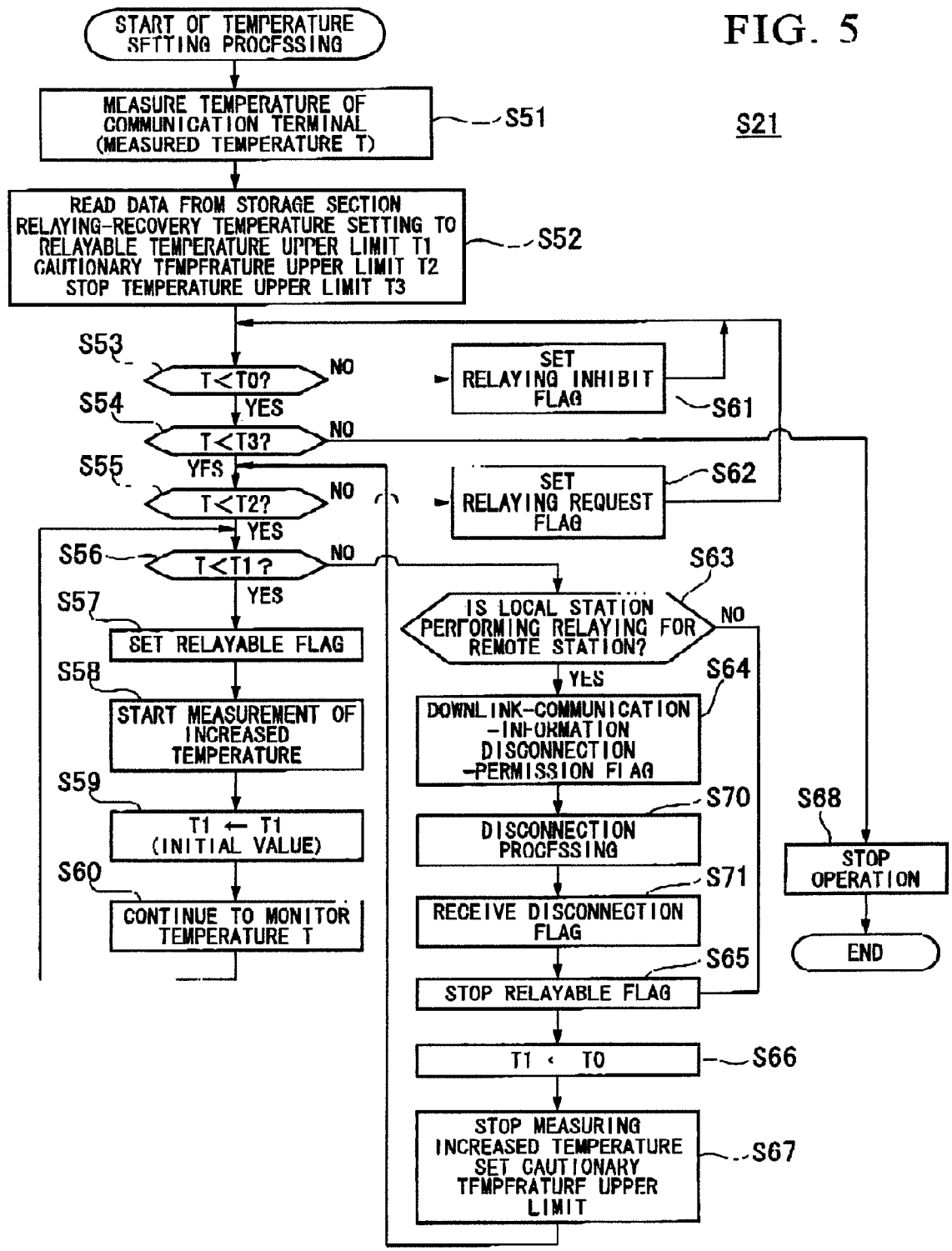
FIG. 5 is a flowchart illustrating a temperature setting processing operation in a communication terminal.

The temperature setting processing operation in step S21 of FIG. 4A will be described in detail with reference to FIG. 5. FIG. 5 is a flowchart illustrating a temperature setting processing operation in the communication terminal 1.

Referring to FIG. 5, the communication terminal 1 measures the temperature in its own casing to obtain a measured temperature T (step S51). Next, a relaying-recovery temperature setting T0, a relayable temperature upper limit T1, a cautionary temperature upper limit T2, and a stop temperature upper limit T3 that are pre-stored in the storage section 20 as data for the communication terminal 1 are read out from the storage section 20 (step S52).

Thereafter, the communication terminal 1 compares the measured temperature T with the relaying-recovery temperature setting T0 (step S53). If the measured temperature T is smaller than the relaying-recovery temperature setting T0, then it is determined that the local station is a relayable terminal, and the flow proceeds to step S54. In step S54, the measured temperature T is compared with the stop temperature upper limit T3. If the measured temperature T is smaller than the stop temperature upper limit T3, then it is determined that the local station is not in an overheated state, and the flow proceeds to step S55. In step S55, the measured temperature T is compared with the cautionary temperature upper limit T2. If the measured temperature T is smaller than the cautionary temperature upper limit T2, then it is determined that the local station does not need relaying, and the flow proceeds to step S56. In step S56, the measured temperature T is compared with the relayable temperature upper limit T1. If the measured temperature T is smaller than the relayable temperature upper limit T1, it is determined that the local station is relayable, and the flow proceeds to step S57. In step S57, a relayable flag is set, and the measured temperature T at that time is stored in the storage section 20 as an increased temperature (step S58). The measurement of an increased temperature is started from this point. Next, the communication terminal 1 substitutes the initial value of the relayable temperature upper limit into the relayable temperature upper limit T1 (step S59) and continues monitoring of the measured temperature T (step S60). Subsequently, the flow proceeds to step S56.

On the other hand, if the measured temperature T is not less than the relaying recovery temperature setting T0 in step S53, it indicates that the local station is a terminal which cannot perform relaying. Therefore, the communication terminal 1 sets a relaying-inhibit flag (step S61), and the flow proceeds to step S53. The relaying-inhibit flag setting processing in step S61 is initiated if the temperature in the casing at initial startup is too high due to the ambient temperature to perform relaying.

Furthermore, if the measured temperature T is not less than the stop temperature upper limit T3 in step S54, the communication terminal 1 stops the operation thereof (step S68). If the measured temperature T is not less than the cautionary temperature upper limit T2 in step S55, it indicates that the local station needs relaying. Therefore, the communication terminal 1 sets a relaying-request flag (step S62), and the flow proceeds to step S53.

If the measured temperature T is not less than the relayable temperature upper limit $T1a$ in step S56, it indicates that the local station cannot perform relaying. In this case, the communication terminal 1 determines whether the local station is performing relaying for a remote station (step S63). If the local station is performing relaying for a remote station, a downlink communication information disconnection-permission flag for the remote station is transmitted (step S64). Thereafter, disconnection processing is performed (step S70), and a disconnection flag from the remote station for which relaying is being performed is received (step S71). Then, the flow proceeds to step S65. On the other hand, if the local station is not performing relaying for a remote station in step S63, the flow proceeds to step S65.

In step S65, the communication terminal 1 stops the relayable flag. Subsequently, in order to decrease the temperature in its own casing to the relayable temperature, the communication terminal 1 substitutes the relaying-recovery temperature setting T0 into the value of the relayable temperature upper limit T1 (step S66). Next, the communication terminal 1 stops the measuring of increased temperature that has been started in step S58 and sets the temperature T measured at this time to the cautionary temperature upper limit T2 (step S67). Then, the flow proceeds to step S55.

Figure 6:
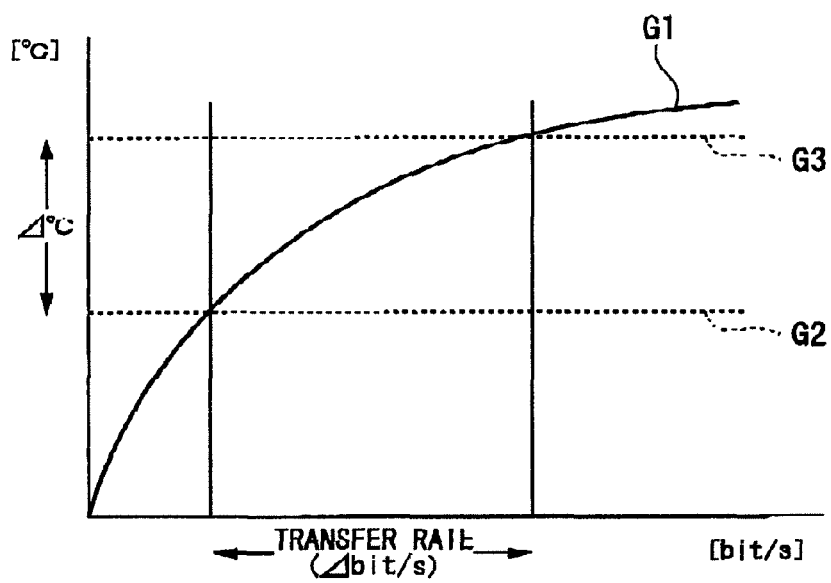
FIG. 6 is a graph illustrating a cautionary temperature rise value.

The cautionary temperature rise value will be described below with reference to FIG. 6. FIG. 6 is a graph illustrating the cautionary temperature rise value.

In the graph of FIG. 6, the vertical axis represents the temperature, and the horizontal axis represents the transfer rate. A waveform G1 is one example of a temperature rise curve in the casing of a communication terminal. This temperature rise curve varies according to the ambient temperature of the communication terminal. An increased-temperature measurement start value G2 corresponds to a value at the increased-temperature measurement start point in step S58 of FIG. 5, and an increased-temperature measurement stop value G3 corresponds to a value at the increased-temperature measurement end point in step S67 of FIG. 5.

As shown in expression (1) of FIG. 6, a bit rate per temperature is calculated based on the temperature rise curve G1, and this calculated value is set as a cautionary temperature rise factor. A cautionary temperature rise value Tu is a value obtained by dividing the remaining amount of data by the cautionary temperature rise factor and then adding the measured temperature T to the result of this division operation (refer to expression (2) in FIG. 6). As a result, the cautionary temperature rise value Tu for the remaining amount of data is obtained. In step S35 of FIG. 4A, the cautionary temperature rise value Tu obtained in this manner is compared with the cautionary temperature upper limit T2.

Figure 7B:
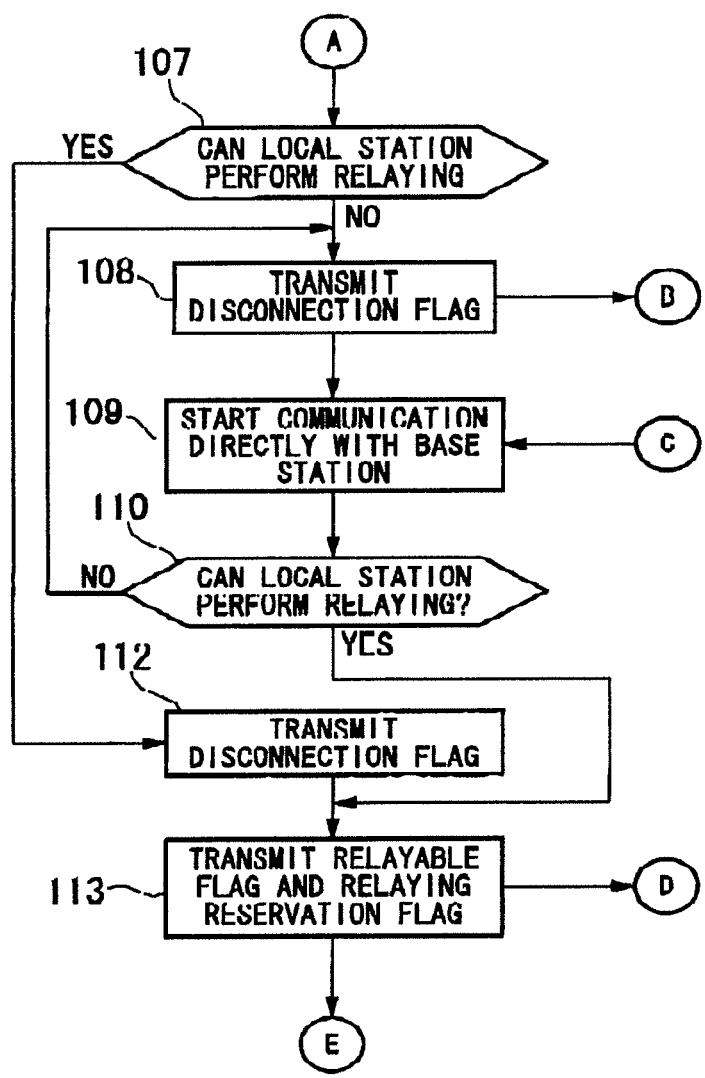

The disconnection processing operation in step S70 of FIG. 5 will be described in detail with reference to FIGS. 7A and 7B. FIGS. 7A and 7B are flowcharts illustrating a disconnection processing operation in the mobile communication system shown in FIG. 1. In the example of FIGS. 7A and 7B, the communication terminal 1 (local station) communicates with the base station 3 via the communication terminal 2 (remote station).

Referring to FIGS. 7A and 7B, the communication terminal 1 requests the communication terminal 2 to perform relaying (step S101), and in response to this request, the communication terminal 2 relays data for the communication terminal 1 from the base station 3 to the communication terminal 1 (step S102). At this time, the communication terminal 2, which is now relaying data for the communication terminal 1, transmits a downlink communication information disconnection flag if the temperature in its own casing increases to exceed the relayable temperature (step S103).

Next, when the communication terminal 1 receives the downlink communication information disconnection flag, the communication terminal 1 determines whether the local station can communicate directly with the base station 3 (step S104). If the communication terminal 1 determines in step S104 that the local station cannot communicate directly with the base station 3, the communication terminal 1 requests another communication terminal as a remote station to perform relaying (step S105). Then, a disconnection flag is transmitted to the communication terminal 2 (step S106).

On the other hand, if the communication terminal 1 determines in step S104 that the local station can communicate directly with the base station 3, it is determined whether the local station can perform relaying (step S107). If the communication terminal 1 determines in step S107 that the local station cannot perform relaying, the communication terminal 1 transmits a disconnection flag to the communication terminal 2 (step S108) to start communication directly with the base station 3 (step S109). Next, the communication terminal determines whether the local station can perform relaying (step S110). If the local station cannot perform relaying, the flow proceeds to step S108, and subsequently steps S108 and S109 are repeated until the local station can perform relaying. When the local station can perform relaying in step S110, the flow proceeds to step S113.

When the communication terminal 2 receives a disconnection flag, it stops a relayable flag (step S111). However, the communication terminal 2 continues to communicate with the base station 3.

If the communication terminal 1 determines in step S107 that the local station can perform relaying, a disconnection flag is transmitted to the communication terminal 2 (step S112). Next, in step S113, the communication terminal 1 transmits a relayable flag and a relaying reservation flag to the communication terminal 2.

When the communication terminal 2 receives a relaying reservation flag (step S114), it is determined whether there is a reservation (step S116) when a subsequent relaying-request flag is set (step S115). If there is a reservation as a result of this determination, a request to perform relaying is sent to the reserving station (communication terminal 1 in this example) (step S117). When the communication terminal 1 receives the relaying-request flag (step S118), the communication terminal 1 performs relaying as a remote station (step S102). On the other hand, the communication terminal 2, which has been functioning as the remote station, functions as a local station to receive a relaying service (step S101).

If there is no reservation in step S116, the communication terminal 2 requests the communication terminal exhibiting the next lowest measured temperature T to perform relaying (step S119).

FIG. 8 is a diagram depicting an example of an extended DRC frame additionally provided with a MAC address.

The MAC address is an address (code) for identifying each communication terminal communicating with the base station 3 in accordance with the EV-DO standard. Header information included in communication information includes the MAC address (6 bits) of the communication terminal 1 which requests relaying. From the communication terminal 2 to the base station 3, an extended DRC symbol of four bits added to the DRC subchannel is transmitted over the uplink traffic data channel. Furthermore, the MAC address information is included by puncturing part of the DRC subchannel. An alternative approach of, for example, including the MAC address information by puncturing part of the pilot subchannel can also be used.

In this embodiment, when downlink traffic data destined for a communication terminal is to be sent according to scheduling, the base station 3 may add to the downlink traffic data a header indicating that the destination is the communication terminal. Moreover, because a communication terminal is aware that a downlink data request corresponding to the downlink traffic data to be received is a request by the communication terminal itself, the communication terminal may select not to append a header to prevent an increase in overhead of the traffic data.

Each communication terminal can send downlink traffic data received from the base station 3 to another communication terminal via a wireless LAN, and that communication terminal can receive the downlink traffic data via the wireless LAN. In this case, the base station 3 performs scheduling based on the proportional fair algorithm described below.

For all communication terminals communicating with the base station 3, the base station 3 stores the average of the most recent assigned communication speeds and updates it with predetermined transmission timings (every 1/600 sec). This average of the most recent assigned communication speeds Ri(n) is given as $$Ri(n)=(1-1/tc) \times Ri(n-1)+1/tc \times ri(n-1)$$

where Ri(n) represents an average data communication speed in slot n for communication terminal 8, ri(n) represents a transmission data communication speed in slot n for communication terminal i, which is 0 if no downlink traffic is assigned to the communication terminal i, and tc(i) represents a time constant.

The base station 3 calculates the following equation function Fi(n) in slot n for communication terminal i.

$$Fi(n)=DRCi(n)/Ri(n)$$

DRCi(n) represents a requested data communication speed in slot n for communication terminal i. This a receivable downlink speed obtained by the communication terminal at which data is transmitted to the base station.

The base station 3 evaluates Fi(n) of communication terminals with transmission timings (every 1/600 sec) and assigns downlink traffic data to the communication terminal exhibiting the maximum Fi(n).

In the above-described calculation process of the evaluation function Fi(n), if the communication terminal i (the communication terminal 1) communicates directly with the base station 3, then "ri(n)=actual communication speed of transmission." On the other hand, if the communication terminal 1 performs communication by using communication terminal j (the communication terminal 2) as a relay station and downlink traffic from the base station 3 is actually assigned to the communication terminal j, then "rj(n)=0" and "ri(n)=actual communication speed of transmission to the communication terminal j" (as opposed to the conventional technique, where "ri(n)=0" and "rj(n)=actual communication speed of transmission").

Alternatively, if "ri(n)=0" and "rj(n)=actual communication speed of transmission to the communication terminal j," then Ri(n) and Rj(n) are given as $$Ri(n)=(1-1/tc)\times Ri(n-1)+1/tc\times rj(n-1)$$

$$Rj(n)=(1-1/tc)\times Rj(n-1)+1/tc\times rj(n-1)$$

Furthermore, when the communication terminal i communicates with the base station in slot n−1 by using the communication terminal j as a relay station and downlink traffic from the base station 3 is assigned to the communication terminal j, a correction is applied to the calculation of Ri(n) and Rj(n) as follow:

$$Ri(n)=(1-1/tc)\times Ri(n-1)|1/tc\times rj(n-1)\times(1|c)$$

$$Rj(n)=(1-1/tc)\times Rj(n-1)+1/tc\times rj(n-1)\times(-c)$$

where c represents a correction factor, which is about 0.1 to 0.5.

In short, the average data rate of the communication terminal i receiving data relayed by the communication terminal j increases by the correction factor c, whereas the average data rate of the communication terminal 2 decreases by the correction factor c. This means that in the subsequent calculation of the evaluation function, the communication terminal 2 is advantageous over the communication terminal 1. A similar correction calculation can also be achieved by, for example, applying an offset to the evaluation function (i.e., decreasing Fi(n) of the communication terminal i and increasing Fj(n) of the communication terminal j).

Through the above-described scheduling technique, there is provided a mechanism for preventing a communication terminal that performs relaying from being allocated unfavorable priority in scheduling and for compensating for any disadvantage in power consumption through scheduling.

A communication terminal that requests relaying of downlink communication information (traffic data), i.e., the communication terminal 1 as the local station in FIG. 1, may not include relaying-execution means for relaying downlink communication information (traffic data) to a neighboring communication terminal. Furthermore, a communication terminal that performs relaying of downlink communication information (traffic data), i.e., the communication terminal 2 as the remote station in FIG. 1, may not include relaying-request means for requesting a neighboring communication terminal to relay downlink communication information (traffic data).

The preferred embodiment of the present invention has been described by way of example of communication terminals (mobile communication terminals). These communication terminals include cellular phone devices, mobile terminals, personal digital assistants (PDA), etc.

According to the present invention, a local station can receive data without causing overheating by using as a relay station the communication terminal exhibiting the lowest temperature in the casing from a plurality of communication terminals in a directly communicable area before the local station is overheated. This improves the user experience. Thus, the present invention is useful for mobile communication systems, communication terminals, and other communication devices.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mobile communication terminal comprising:
    a first wireless communication unit that communicates with a base station;
    a second wireless communication unit that communicates with another mobile communication terminal including an equivalent of the first wireless communication unit;
    a temperature measurement unit; and
    a control unit that selects communication using only a single one of the first wireless communication unit and the second wireless communication unit according to a temperature measured by the temperature measurement unit,
    wherein the temperature measurement unit measures a temperature in a casing of the mobile communication terminal.

2. The mobile communication terminal according to claim 1, wherein, when the second wireless communication unit is to be selected, the control unit determines whether a communication partner can communicate with the second wireless communication unit to select the second wireless communication unit or the communication partner.

3. The mobile communication terminal according to claim 2, wherein, if the second wireless communication unit can be used, the control unit reports that the second wireless communication unit can be used.

4. The mobile communication terminal according to claim 1, wherein the control unit manages temperature limits up to which the first and second wireless communication units, can be used based on the measured temperature.

5. The mobile communication terminal according to claim 1, wherein the control unit predicts whether each of the first and second wireless communication unit can be used based on a remaining amount of communication data and the measured temperature.

6. A mobile communication system comprising:
    a base station; and
    a plurality of mobile communication terminals, at least one of which includes:
    a first wireless communication unit that communicates with the base station;
    a second wireless communication unit that communicates with another mobile communication terminal including an equivalent of the first wireless communication unit;
    a temperature measurement unit; and
    a control unit that selects communication using only a single one of the first wireless communication unit and the second wireless communication unit according to a temperature measured by the temperature measurement unit, wherein
    one communication terminal relays communication between the base station and another communication terminal by using the second wireless communication unit, and
    the temperature measurement unit measures a temperature in a casing of the mobile communication terminal.

7. A communication control method for controlling a first communication between a base station and one mobile communication terminal and a second communication between the one mobile communication terminal and another mobile communication terminal, the method comprising the steps of:
  measuring temperatures of the mobile communication terminals; and
  selecting only a single one of the first communication and the second communication according to the measured temperatures,
  wherein the step of measuring measures a temperature in a casing of the mobile communication terminal.

* * * * *